United States Patent
Stone

(10) Patent No.: US 12,506,941 B2
(45) Date of Patent: *Dec. 23, 2025

(54) SYSTEMS AND METHODS FOR ENHANCED PERFORMANCE OF CAMERA DEVICES

(71) Applicant: Comcast Cable Communications, LLC, Philadelphia, PA (US)

(72) Inventor: Christopher Stone, Newtown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,512

(22) Filed: Mar. 14, 2024

(65) Prior Publication Data

US 2024/0305873 A1    Sep. 12, 2024

Related U.S. Application Data

(63) Continuation of application No. 17/515,141, filed on Oct. 29, 2021, now Pat. No. 11,962,880.

(51) Int. Cl.
| | |
|---|---|
| *H04N 23/52* | (2023.01) |
| *H04N 7/18* | (2006.01) |
| *H04N 17/00* | (2006.01) |
| *H04N 23/71* | (2023.01) |

(52) U.S. Cl.
CPC ............ *H04N 23/52* (2023.01); *H04N 7/188* (2013.01); *H04N 17/002* (2013.01); *H04N 23/71* (2023.01)

(58) Field of Classification Search
CPC .. H04N 5/22521; H04N 5/2351; H04N 7/188; H04N 17/002
See application file for complete search history.

(56) References Cited

U.S. PATENT DOCUMENTS

| | | | | |
|---|---|---|---|---|
| 3,198,883 | A * | 8/1965 | Borberg | H04N 23/75 348/E5.04 |
| 10,538,326 | B1 | 1/2020 | Cui et al. | |
| 10,989,839 | B1 * | 4/2021 | Matthews | G01W 1/10 |
| 11,962,880 | B2 * | 4/2024 | Stone | H04N 23/60 |
| 2009/0059033 | A1 | 3/2009 | Shimada et al. | |
| 2019/0158011 | A1 * | 5/2019 | West | G06N 20/20 |

(Continued)

FOREIGN PATENT DOCUMENTS

| | | |
|---|---|---|
| CN | 109491400 A | 3/2019 |
| JP | 2010-147720 A | 7/2010 |

(Continued)

OTHER PUBLICATIONS

US Patent Application filed on Oct. 29, 2021, entitled "Systems and Methods for Enhanced Performance of Camera Devices",, U.S. Appl. No. 17/515,141.

*Primary Examiner* — Michael Lee
(74) *Attorney, Agent, or Firm* — BakerHostetler

(57) ABSTRACT

A camera device's exposure to sunlight may be monitored. The sun exposure may be used to predict a solar event associated with the camera device, such as a critical temperature, a brightness level, or an angle of sunlight. Prior to occurrence of the solar event, one or more functions of the camera device may be enabled or disabled. For example, a cooling function of the camera device may be enabled or a characteristic of video streamed by the camera device may be modified. The function may be re-enabled or re-disabled after the solar event.

36 Claims, 7 Drawing Sheets

(56) References Cited

U.S. PATENT DOCUMENTS

| | | |
|---|---|---|
| 2019/0236365 A1 | 8/2019 | Speasl et al. |
| 2021/0201070 A1* | 7/2021 | Omari ................ G01C 21/3635 |
| 2022/0084242 A1 | 3/2022 | Takashima et al. |
| 2022/0279156 A1 | 9/2022 | Sundram et al. |
| 2022/0357714 A1 | 11/2022 | Berman et al. |

FOREIGN PATENT DOCUMENTS

| | | | |
|---|---|---|---|
| JP | 2014-192762 A | 10/2014 | |
| WO | WO-2020105124 A1 * | 5/2020 | ........... A01B 69/001 |

* cited by examiner

SYSTEMS AND METHODS FOR ENHANCED PERFORMANCE OF CAMERA DEVICES

CROSS-REFERENCE TO RELATED APPLICATIONS

This Application is a continuation of U.S. patent application Ser. No. 17/515,141, filed Oct. 29, 2021, now U.S. Pat. No. 11,962,880, which is incorporated herein by reference in its entirety.

BACKGROUND

The performance of outdoor camera devices may be impacted by thermal and/or visual effects of the sun, such as from ultraviolet (UV) rays hitting a plastic portion of the camera, light hitting the lens of the camera, etc. Some of the effects are compensated for by the design of the camera. For example, a camera may be designed with heat sinks, high dynamic range (HDR) processing in a sensor of the camera and image signal processor (ISP), and/or a UV coating on the plastic portion of the camera. Some of these solutions are based on processes, such as determining heat using one or more thermistors and/or responding to the sun's rays hitting the sensor to determine how to perform HDR processing. However, these processes are time-consuming. Furthermore, there are cases where the video stream is impaired while the algorithm takes effect.

SUMMARY

A camera device's exposure to the sun may be predictively monitored and used as a factor in determining whether to enable or disable one or more functions of the camera device in order to improve the performance of the camera device. For example, the functions of the camera device may be enabled or disabled in anticipation of a solar event, such as a critical camera device temperature, a brightness level, and/or an angle of sunlight. The function may comprise a cooling function. The function may comprise a video streaming function of the camera device, such as a resolution, frame rate, or data rate of video generated and/or sent by the camera device. The function of the camera device may be enabled and/or disabled for a duration of the solar event.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
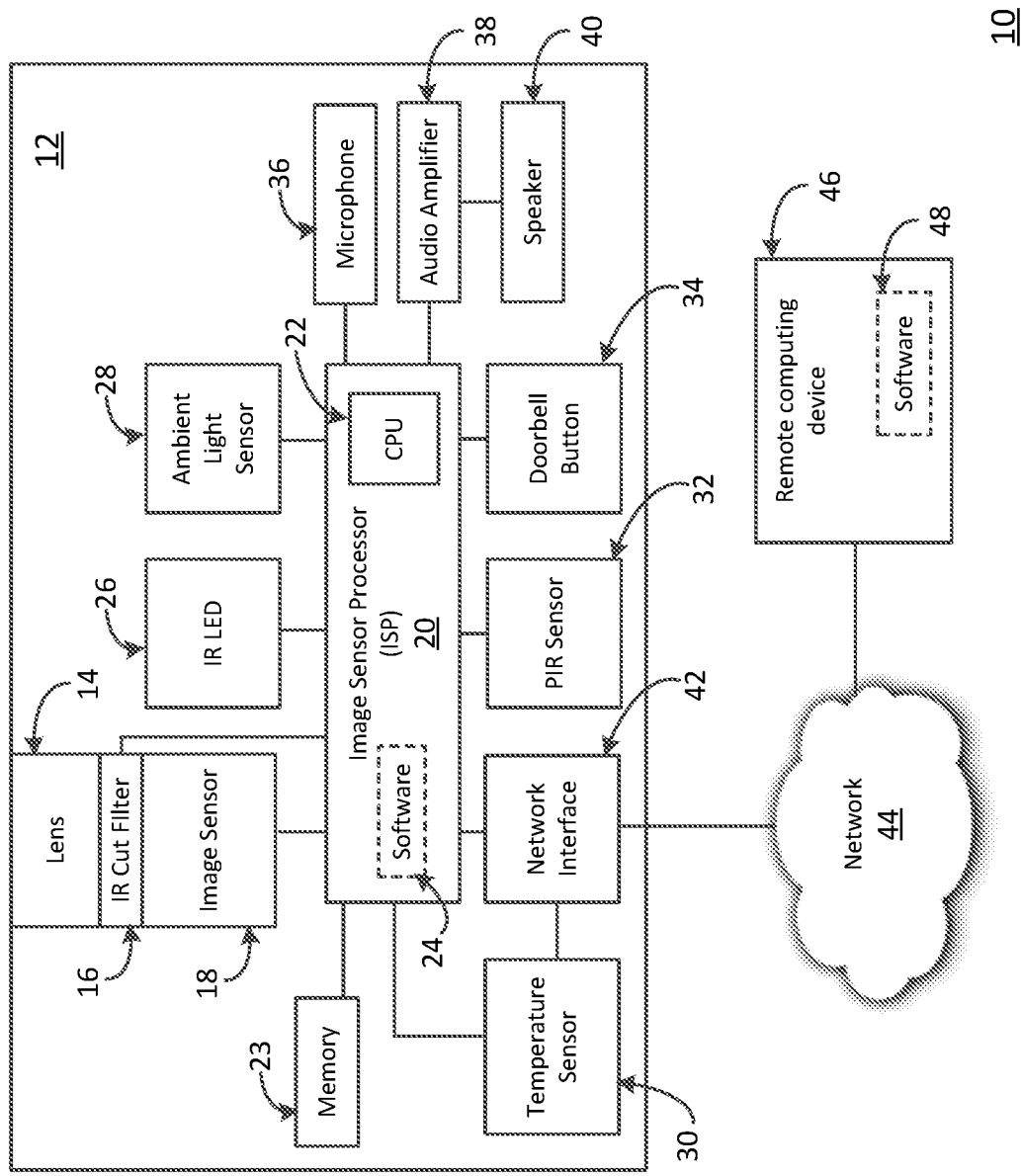
FIG. 1 shows an example system.

FIG. 1 shows an example system 10. The systems, methods, and apparatuses described herein may be implemented in such an example system. The system 10 may comprise a camera device 12. The camera device 10 may comprise a component of a premises management system, such as, for example, a security system, a home automation system, or the like. The camera device may comprise a camera, an outdoor camera, a surveillance camera, a security camera, a doorbell camera, a video doorbell camera, a dashboard camera, or any other type of device incorporating a camera. The camera device 12 may be mounted in an environment in which it may be exposed to sunlight.

The camera device 12 may comprise a lens 14 that focuses images onto an image sensor 18 for electronic capture of the images. The image sensor 18 may be any of a variety of different types of images sensors, such as, for example, a charged-coupled device (CCD) sensor, a complementary metal-oxide semiconductor (CMOS) sensor, or any other suitable type of image sensor. The camera device 12 may further comprise an infrared (IR) cut filter 16 for filtering infrared light.

The camera device 12 may further comprise an image sensor processor (ISP) 20, which may comprise a central processing unit 22 and software 24. The software 24 may comprise computer-executable instructions (e.g., program code) that may be executed by the CPU 22. The software 24 may implement a form of artificial intelligence (AI), such as, for example, machine learning or the like. The software 24 may perform one or more of the methods described herein. The camera device 12 may further comprise a memory 23, which may be implemented using any suitable memory technology, such as, for example, random access memory (RAM), dynamic RAM (DRAM), an embedded Multi-Media Card (eMMC), non-volatile flash memory (e.g., NAND), or the like.

The camera device 12 may further comprise one or more sensors for sensing conditions of an environment in which the camera device 10 may be positioned, installed, or otherwise disposed. For example, the camera device 12 may comprise an ambient light sensor 28 for sensing ambient light. Signals or data indicative of the sensed ambient light may be input to the ISP 20. As another example, the camera device 12 may comprise a temperature sensor 30 for sensing the temperature. The temperature sensor 30 may sense the internal temperature of the camera device 12. The temperature sensor 30 may sense the external temperature of an area around the camera device 12. Signals or data indicative of the temperature sensed by the temperature sensor 30 may be input to the ISP 20. As yet another example, the camera device 12 may comprise a motion sensor 32, such as, for example, a passive infrared (PIR) sensor, for sensing motion in the vicinity of the camera device. Signals or data indicative of sensed motion may be input to the ISP 20. The camera device 12 may comprise other types of sensors for sensing other conditions.

The camera device 12 may further comprise other types of input or output components. For example, the camera device 12 may comprise a microphone 36 for receiving audio input, which audio input may also be provided to the ISP 20. In the case of a video doorbell or other type of doorbell camera, the camera device 12 may comprise a doorbell button 34. The camera device 12 may further comprise an audio amplifier 38 and a speaker 40 for output of sounds or other audio. The camera device 12 may further comprise an infrared light source 26, such as an infrared light-emitting diode (LED), in order to provide a source of infrared light for image or video capture in dark environments, such as nighttime.

The camera device 12 may further comprise a network interface 42 to enable the camera device 12 to communicate over a network 44 with one or more other computing devices, such as, for example, a remote computing device 46. The network 44 may comprise a wired network, a wireless network, a cellular network, a local area network, a wide area network, the internet, or any other suitable communications network. The network interface 42 may implement any of a variety of different communications protocols to facilitate such network communications, such as, for example, Ethernet, IEEE 802.11 (Wi-Fi), Bluetooth, Zigbee, 3G, 4G, LTE, 5G, or the like. The remote computing device 46 may also comprise software, such as software 48, which may execute on the remote computing device to perform one or more of the methods described herein.

Figure 2:
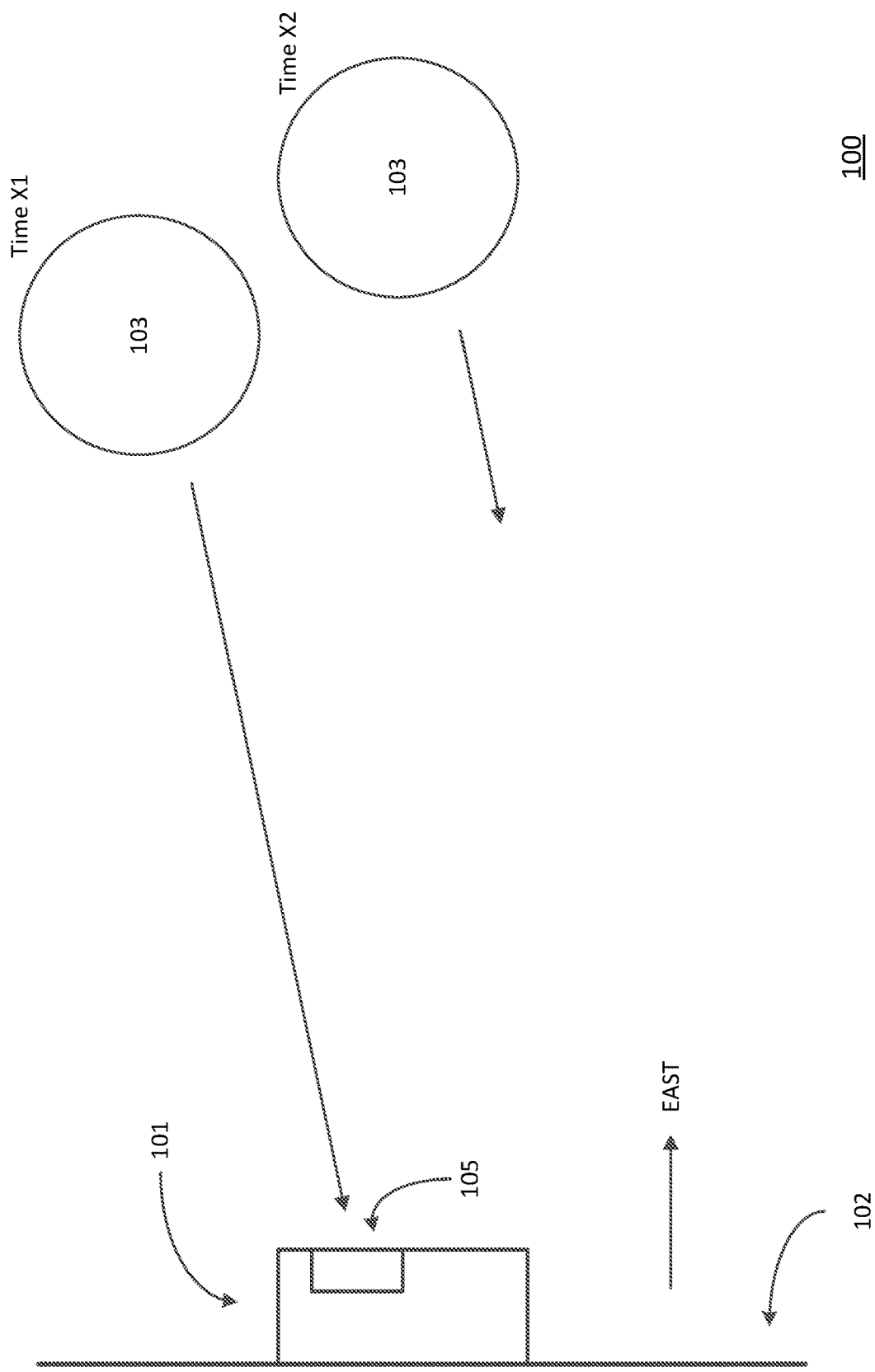
FIG. 2 shows an example environment.

FIG. 2 shows an example environment 100. The environment may comprise a camera device 101. The camera device 101 may comprise the camera device 12 of FIG. 1. The camera device 101 may comprise a lens 105 (e.g., the lens 14 of FIG. 1). The camera device 101 may be a component of a premises management system (e.g., a security system, an automation system, etc.). The camera device 101 may be configured to communicate with one or more components of the premises management system, such as a security panel, a gateway, or a sensor device, as examples. The camera device 101 may be configured to communicate with a user device, such as a mobile device and/or a display device. The camera device 101 may be mounted on an object or surface 102, such as a wall or a stick.

The camera device 101 may be configured to generate image data, such as image or video. The camera device 101 may be configured to send the image data to a component of the premises management system or another device. The camera device 101 may be configured to send the image data, such as by streaming the image data. The camera device 101 may be configured to send live image data and/or recorded image data.

The camera device 101 may have an orientation. The orientation may be indicated by a cardinal direction. For example, as shown in FIG. 2, the camera device 101 is facing East. The camera device 101 may comprise a component that determines the direction in which the camera device 101 is facing, such as a magnetometer and/or a gyroscope. Based on the direction of the camera device 101, the camera device 101 and/or a computing device in communication with the camera device may determine in what direction the sun's 103 rays will hit the camera device 101. For example, in FIG. 2, it may be determined that the sun's 103 rays will hit the camera device 101 from the East. Based on the direction of the camera device 101, a time at which the sun's 103 rays may hit the camera device 101 may be determined.

Additionally and/or alternatively, the camera device 101 may comprise a component configured to monitor the sun. The component may comprise, for example, an ambient light sensor (such as the ambient light sensor 28 of FIG. 1). Alternatively, or in addition, the component may comprise an image sensor (such as the image sensor 18 of FIG. 1) of the camera device 101 in combination with software that may be used to determine an image of the sun. Monitoring the sun may comprise using an algorithm to learn where the sun 103 is located. The algorithm may be implemented in software that executes within the camera device 101 (such as the software 24 of FIG. 1) or within a remote computing device (such as the software 48 of FIG. 1). The algorithm may employ artificial intelligence. The artificial intelligence may comprise a machine learning model. The artificial intelligence may monitor the sun 103 and/or the moon over a period of time. Geographic information, such as GPS, or a determination of where the camera device 101 is installed (e.g., provided by a user) may be combined to provide more accurate data on the sun's location. The geographic information may be used to determine a time X1 that a solar event may occur.

The solar event may comprise a thermal event, such as a time that the camera device 101 may reach a critical temperature at which its operation is compromised. The solar event may comprise a visual or light effect, such as the sun's 103 rays hitting the camera device 101 or the lens 105 of the camera device 101. The solar event may comprise a critical brightness level of the sun's 103 rays on the camera device 101. The solar event may comprise an angle of the sun's 103 rays on the camera device 101. The solar event may have the potential to cause damage to hardware of the camera device, such as a component of the camera device 101 that generates the image data (e.g., the image sensor 18 of FIG. 1). The solar event may have the potential to cause damage to the image data generated by the camera device 101. The solar event may impact the sending of image data by the camera device 101.

The camera device 101, a component of the camera device 101, or a component of a premises management system of which the camera device is a part, may be configured to access weather data, such as publicly-available weather reports and/or weather data from third parties. Based on the weather data, current and/or future weather conditions may be determined. Based on the location of the camera device 101 and/or the weather condition, the time X1 at which the solar event may occur may be determined.

Prior to the determined time X1 at which the solar event may occur, one or more functions of the camera device 101 may be enabled or disabled. The functions may be enabled or disabled at a predetermined time before the time X1 that the solar event may occur. For example, the functions may be enabled or disabled 5 minutes, 10 minutes, 30 minutes, or an hour before the time X1 at which the solar event may occur. The predetermined time may be determined to minimize the impact of the solar event to the camera device 101 and its function, such as sending image data. For example, initially the predetermined time may be set to 0 minutes. After the camera device monitors the thermal impact of the sun, the camera device may determine that it needs to enable or disable the functions at a time 5 minutes before X1. This predetermined time may be continuously or periodically adjusted based on changing conditions, such as changes to the season. For example, the predetermined time may be adjusted on a daily, weekly, or monthly basis, as needed to ensure an optimal predetermined time that minimizes the impact to the user experience. Enabling or disabling one or more functions of the camera device a predetermined time before the time X1 may result in reducing an internal temperature of the camera device X1 prior to the solar event occurring at time X1, so that the impact of the solar event (e.g., a rise in the internal temperature) is lessened in advance of (i.e., in anticipation of) the solar event.

Enabling or disabling the function of the camera device 101 may comprise enabling or disabling a cooling function of the camera device. The cooling function may comprise turning on an internal fan.

Enabling or disabling the function of the camera device 101 may comprise enabling or disabling high dynamic range (HDR) imaging on the camera device 101.

Enabling or disabling the function of the camera device 101 may comprise modifying a resolution of the image data being captured and/or sent. For example, the image data may be captured or sent at a reduced resolution of 720×480p at a frame rate of 15 fps at the predetermined time prior to time X1. At a time X2 at which the solar event may have been determined to end, the image data may resume being sent at the preferred higher resolution of 1920×1080p at a frame rate of 30 fps.

Enabling or disabling the function of the camera device 101 may comprise modifying a frame rate of the image data being captured or sent. The frame rate may be decreased. For example, the image data may be sent at a frame rate of 15 frames per second at the predetermined time prior to time X1. At time X2, after the solar event has passed, the image data may resume being sent at a frame rate of 30 frames per second.

Figure 3:
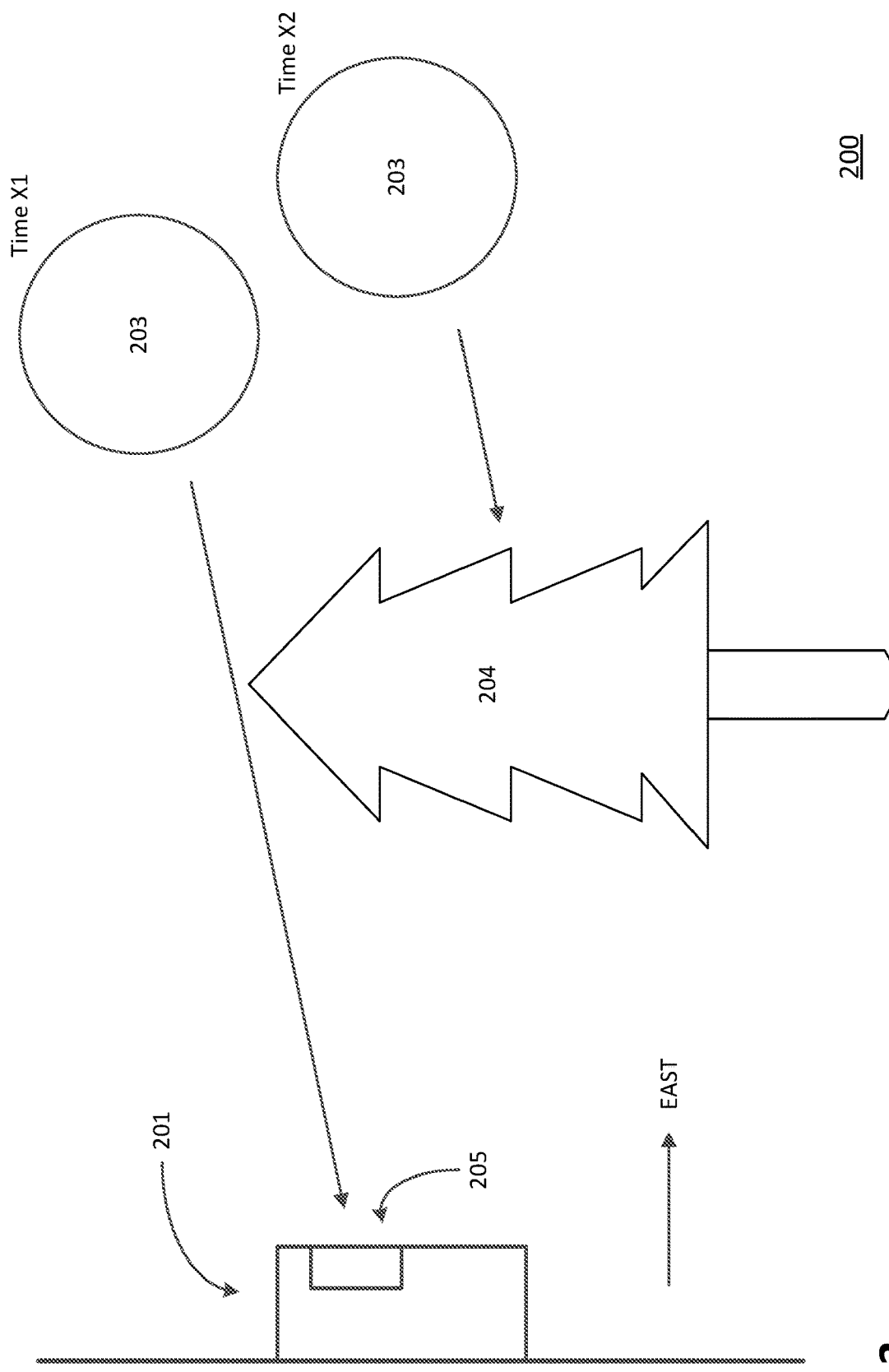
FIG. 3 shows an example environment.

FIG. 3 shows an example environment 200. The environment 200 may comprise a camera device 201. The camera device 201 may be similar to the camera device 101 in FIG. 2. The camera device 201 may be the camera device 12 of FIG. 1. The camera device 201 and/or another computing device in communication with the camera device 201 may be configured to perform monitoring and predicting a time X1 of a solar event and causing enablement or disablement of one or more functions of the camera device 201 at a time prior to the time X1 of the solar event, similarly to the method described with reference to FIG. 2.

An object 204, such as, for example, a tree, an umbrella, a sign, a mailbox, or other object, may be present in the environment 200. The object 204 may block the camera device 201 from the sun's 203 rays. As the sun's 203 position changes, the sun 203 may be above the object 203 at a time X1, at which point the camera device 203 may be exposed to the rays of the sun 203. The object 204 may block the sun's rays only during some periods of time. For example, in the case of a tree, in winter the tree may have no leaves and may not block any of the sun's rays. However, in the spring and/or summer, when the tree has leaves, it may block the sun's rays. Thus, the extent to which a solar event may occur may be different for different periods of time (e.g., different seasons). The algorithm used to predict the time X1 of the solar event may take into account the changing conditions over such periods of time.

The camera device 201 and/or a computing device in communication with the camera device 201 may be configured to determine the existence and/or location of the object 204. Artificial intelligence may be used to determine the existence and/or the location of the object 204. It may be determined that the object 204 is blocking the rays of the sun 203. For example, based on the location of the camera device 201, the location of the object 204, the location of the sun 203, weather data, and/or current brightness levels associated with the camera device, it may be determined that the object 204 is blocking the rays of the sun 203.

For example, it may be determined that the camera device 201 faces East and the sun 203 rises at 8:45 a.m. It may be determined that the sun 203 will be at a location where the rays will hit the camera device 201 at 11:15 a.m. (e.g., time X1). It may be determined that the temperature will peak at 82 Fahrenheit around 1 p.m. It may be determined that the temperature will reach 78 Fahrenheit around 11:15 a.m. Based on this information, HDR may be enabled at 11:00 a.m. Based on this information, the camera device may be caused to switch to a lower resolution encoding scheme at 11:45 a.m.

Enabling or disabling a function of the camera device 201 in anticipation of a solar event may result in an improved viewer experience. If such functions are not enabled or disabled in response to the solar event, there may be a period of time in which the camera device 201 may stream poorly or not at all, resulting in a window of interrupted viewing of the image data. According to the disclosed method, viewing of image data from the camera device 201 may be more consistent, as any changes resulting from the enabling or disabling may happen gradually and prior to degradation of the imaging due to the solar event.

As another example, the camera device 201 may face South. It may be determined that a temperature in the location of the camera device 201 will not exceed 75° F. Based on the determination that the temperature will not exceed 75° F., it may be determined that functions will not be enabled or disabled. For example, if an internal temperature of the camera device 201 reaches 100 F, the functions may not be enabled or disabled based on the determination that the temperature is unlikely to rise and the temperature has likely reached its maximum for the day.

Figure 4:
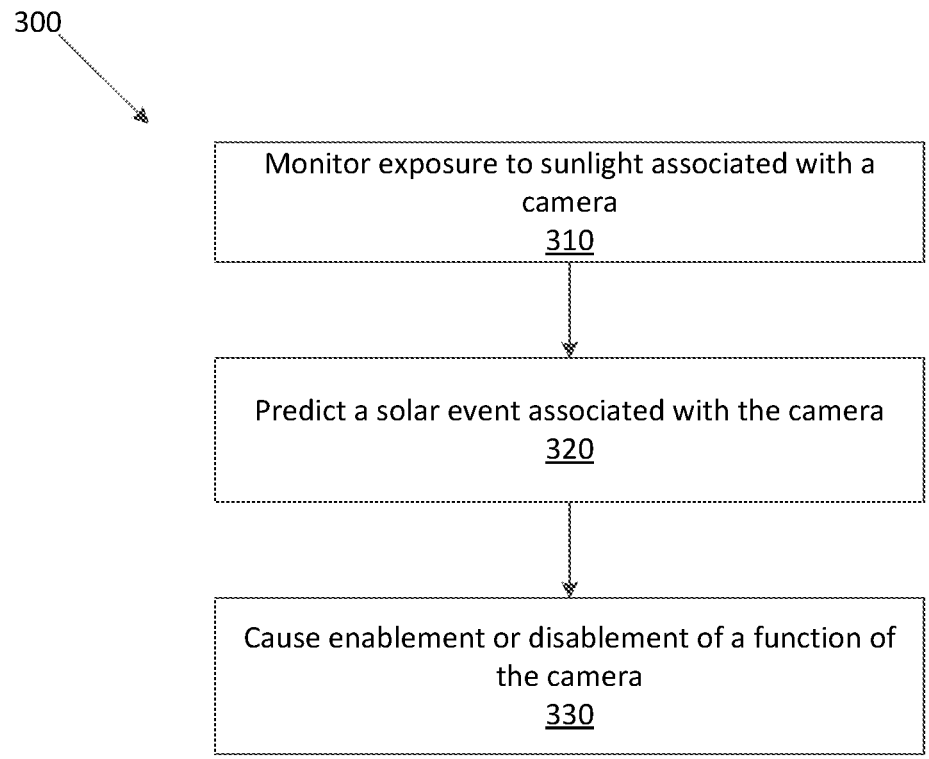
FIG. 4 shows an example method.

FIG. 4 shows an example method 300. At step 310, a camera device's exposure to sunlight may be monitored. The camera device may be similar to the camera device 12 in FIG. 1, the camera device 101 in FIG. 2 and/or camera device 201 in FIG. 3. The sunlight exposure associated with the camera device may be monitored by a component of the camera device and/or a computing device in communication with the camera device, such as a computing device associated with a premises management system of which the camera device may be a part.

Monitoring the sunlight exposure associated with the camera device may comprise using an algorithm to learn where the sun is positioned. The algorithm may employ artificial intelligence (AI), such as machine learning. The algorithm may be used to monitor the position of the sun and/or the moon over a period of time. Geographic information, such as GPS, or a determination of where the camera device is installed (e.g., provided by a user) may be pooled. The algorithm may be used to determine the presence of an object blocking the camera device from the sun's rays. For example, the algorithm may be used to determine a period of time during which an object may block the camera device from the sun's rays. The geographic information and/or the information about the object may be used to determine a time X1 that a solar event may occur.

The solar event may comprise a thermal event, such as the time that the camera device will reach a critical temperature at which its operation is compromised. The solar event may comprise a visual or light effect, such as the sun's rays hitting the camera device or the lens of the camera device. The solar event may comprise a critical brightness level of the sun's rays on the camera device. The solar event may comprise an angle of the sun's rays on the camera device. The solar event may have the potential to cause damage to hardware of the camera device, such as a component of the camera device that generates the image data. The solar event may have the potential to cause damage to the image data generated by the camera device.

The camera device and/or a component of the camera device may be configured to access weather data, such as publicly-available weather reports and/or weather data from third parties. Based on the weather data, current and/or future weather conditions may be determined. The weather data may be used in combination with other sensed or determined conditions to help predict a time X1 of a solar event.

At step 320, a solar event associated with the camera device may be predicted. The solar event may be predicted based on the monitoring the camera device's sunlight exposure. The solar event may be predicted based on other or additional information, such as the aforementioned weather data. The solar event may comprise a thermal event, such as the time that the camera device will reach a critical temperature at which its operation is compromised. The solar event may comprise a visual or light effect, such as the sun's rays hitting the camera device or the lens of the camera device. The solar event may comprise a critical brightness level of the sun's rays on the camera device. The solar event may comprise an angle of the sun's rays on the camera device. The solar event may have the potential to cause damage to hardware of the camera device, such as a component of the camera device that generates the image data. The solar event may have the potential to cause damage to the image data generated by the camera device. Predicting the solar event may comprise determining a time associated with the solar event.

At step 330, one or more functions of the camera device may be caused to be enabled or disabled. The one or more functions may be caused to be enabled or disabled based on the predicting the solar event associated with the camera device. The camera device may cause the one or more functions to be enabled or disabled. A computing device in communication with the camera device may cause the one or more functions to be enabled or disabled.

The one or more functions may enabled or disabled a predetermined time before the time X1 that the solar event may occur. For example, the functions may be enabled or disabled 5 minutes, 10 minutes, 30 minutes, or an hour before the time X1 at which the solar event may occur. The predetermined time prior to time X1 may be determined to minimize the impact of the solar event to the camera device and its functions, such as capturing and sending image data.

Enabling or disabling the one or more functions of the camera device may comprise enabling a cooling function of the camera device. The cooling function may comprise operation of an internal fan. Enabling or disabling the function of the camera device may comprise enabling of disabling high dynamic range (HDR) imaging on the camera device. Enabling or disabling the one or more functions of the camera device may comprise modifying a resolution of the image data being captured or sent. Enabling or disabling the one or more functions of the camera device may comprise modifying a frame rate of the image data being captured or sent. For example, the frame rate may be decreased. Enabling or disabling the one or more functions of the camera device may comprise modifying a data rate of the image data being sent. For example, the data rate may be decreased.

Figure 5:
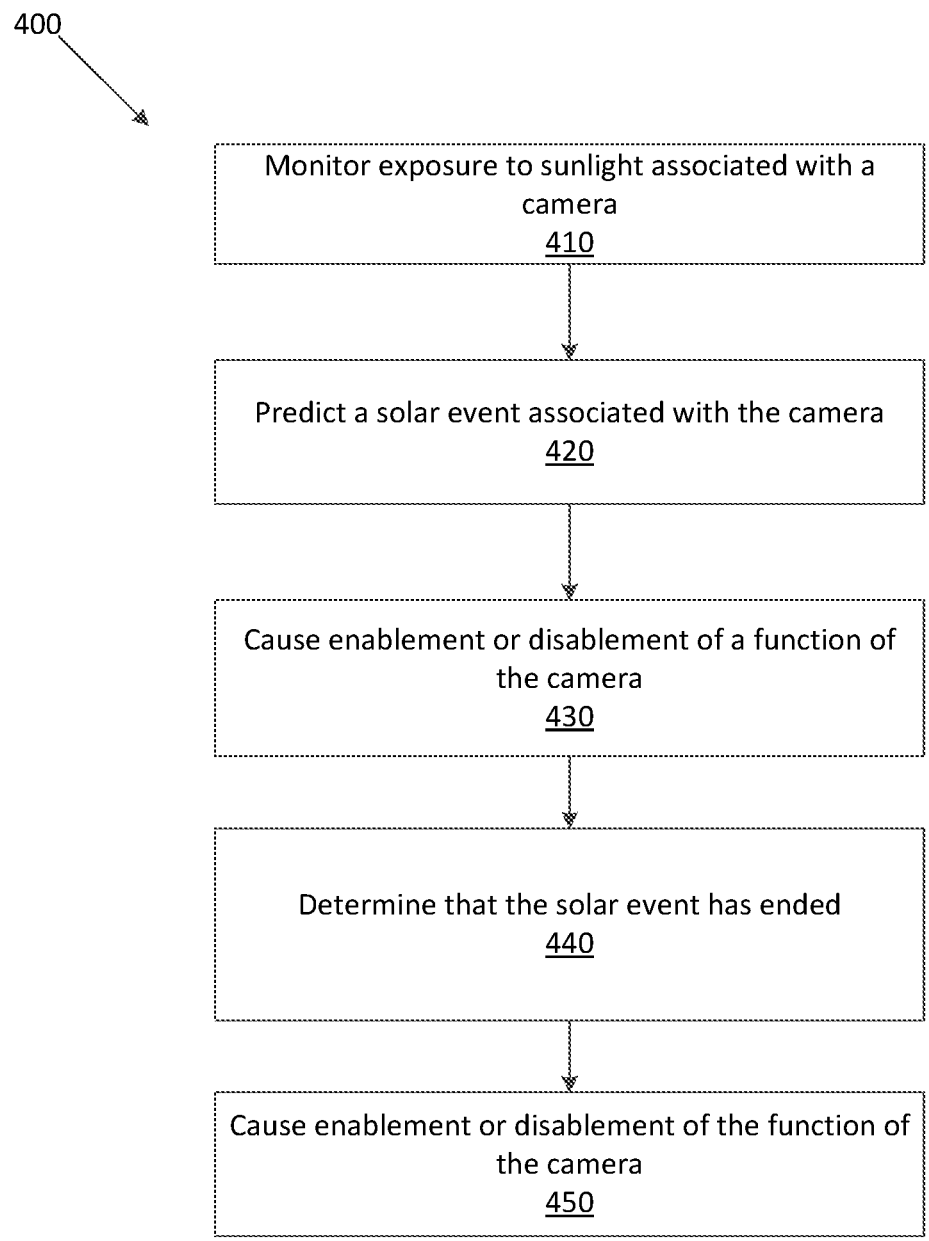
FIG. 5 shows an example method.

FIG. 5 shows a method 400. At step 410, a camera device's exposure to sunlight may be monitored. The camera device may be similar to the camera device 12 in FIG. 1, the camera device 101 in FIG. 2 and/or camera device 201 in FIG. 3. The sunlight exposure associated with the camera device may be monitored by a component of the camera device and/or a computing device in communication with the camera device.

Monitoring the sunlight exposure associated with the camera device may comprise using an algorithm to learn where the sun is positioned. The algorithm may employ artificial intelligence (AI), such as machine learning. The algorithm may be used to monitor the sun and/or the moon over a period of time. Geographic information, such as GPS, or a determination of where the camera device is installed (e.g., provided by a user) may be input to the algorithm. The algorithm may be used to determine the presence of an object blocking the camera device from the sun's rays over time. The geographic information and/or the information about the object may be used, together with the monitored position of the sun and the other information described herein, to determine the time X1 that a solar event may occur.

The solar event may comprise a thermal event, such as the time that the camera device will reach a critical temperature at which its operation is compromised. The solar event may comprise a visual or light effect, such as the sun's rays hitting the camera device or the lens of the camera device. The solar event may comprise a critical brightness level of the sun's rays on the camera device. The solar event may comprise an angle of the sun's rays on the camera device. The solar event may have the potential to cause damage to hardware of the camera device, such as a component of the camera device that generates the image data. The solar event may have the potential to cause damage to the image data generated by the camera device.

The camera device and/or a component of the camera device may be configured to access weather data, such as publicly-available weather reports and/or weather data from third parties. Based on the weather data, current and/or future weather conditions may be determined. The weather data may be used in combination with the other information or sensed or determined conditions to help predict the time X1 of the solar event.

At step 420, a solar event associated with the camera device may be predicted. The solar event may be predicted based on the monitoring the camera device's sunlight exposure. The solar event may comprise a thermal event, such as the time that the camera device will reach a critical temperature at which its operation is compromised. The solar event may comprise a visual or light effect, such as the sun's rays hitting the camera device or the lens of the camera device. The solar event may comprise a critical brightness level of the sun's rays on the camera device. The solar event may comprise an angle of the sun's rays on the camera device. The solar event may have the potential to cause damage to hardware of the camera device, such as a component of the camera device that generates the image data. The solar event may have the potential to cause damage to the image data generated by the camera device. Predicting the solar event may comprise determining a time associated with the solar event, such as the time X1.

At step 430, one or more functions of the camera device may be caused to be enabled or disabled. The one or more functions may be caused to be enabled or disabled based on the predicting the solar event associated with the camera device. The camera device may cause the one or more functions to be enabled or disabled. A computing device in communication with the camera device may cause the one or more functions to be enabled or disabled.

The one or more functions may enabled or disabled a predetermined time before the time X1 that the solar event may occur. For example, the functions may be enabled or disabled 5 minutes, 10 minutes, 30 minutes, or an hour before the time X1 at which the solar event may occur. The predetermined time prior to time X1 may be determined to minimize the impact of the solar event to the camera device and its operation, such as capturing or sending image data.

Enabling or disabling the one or more functions of the camera device may comprise enabling a cooling function of the camera device. The cooling function may comprise operation of an internal fan. Enabling or disabling the one or more functions of the camera device may comprise enabling high dynamic range (HDR) imaging by the camera device. Enabling or disabling the one or more functions of the camera device may comprise modifying a resolution of the image data being captured or sent. Enabling or disabling the one or more functions of the camera device may comprise modifying a frame rate of the image data being captured or sent. For example, the frame rate may be decreased. Enabling or disabling the one or more functions of the camera device may comprise modifying a data rate of the image data being sent. For example, the data rate may be decreased.

At step 440, it may be determined that the solar event has ended. The camera device may determine that the solar event has ended. A computing device in communication with the camera device may determine that the solar event has ended. It may be determined that the solar event has ended based on the location of the camera device. It may be determined that the solar event has ended based on a position of the sun. It may be determined that the solar event has ended based on an internal temperature of the camera device. It may be determined that the solar event has ended based on an external temperature associated with the camera device. It may be determined that the solar event has ended based on a brightness level associated with the camera device or a lens of the camera device. Like the time X1 at which the solar event is predicted to occur, the time at which the solar event will end may also be predicted based on the various types of information used by the aforementioned algorithm.

At step 450, one or more functions of the camera device may be caused to be enabled or disabled. The one or more functions may be caused to be enabled or disabled based on the determining that the solar event has ended. Enabling or disabling the one or more functions may comprise enabling or disabling the function that was enabled or disabled in step 430. For example, if a resolution was lowered in step 430, the resolution may be increased in step 450. If a cooling function was enabled in step 430, the cooling function may be disabled in step 450.

Figure 6:
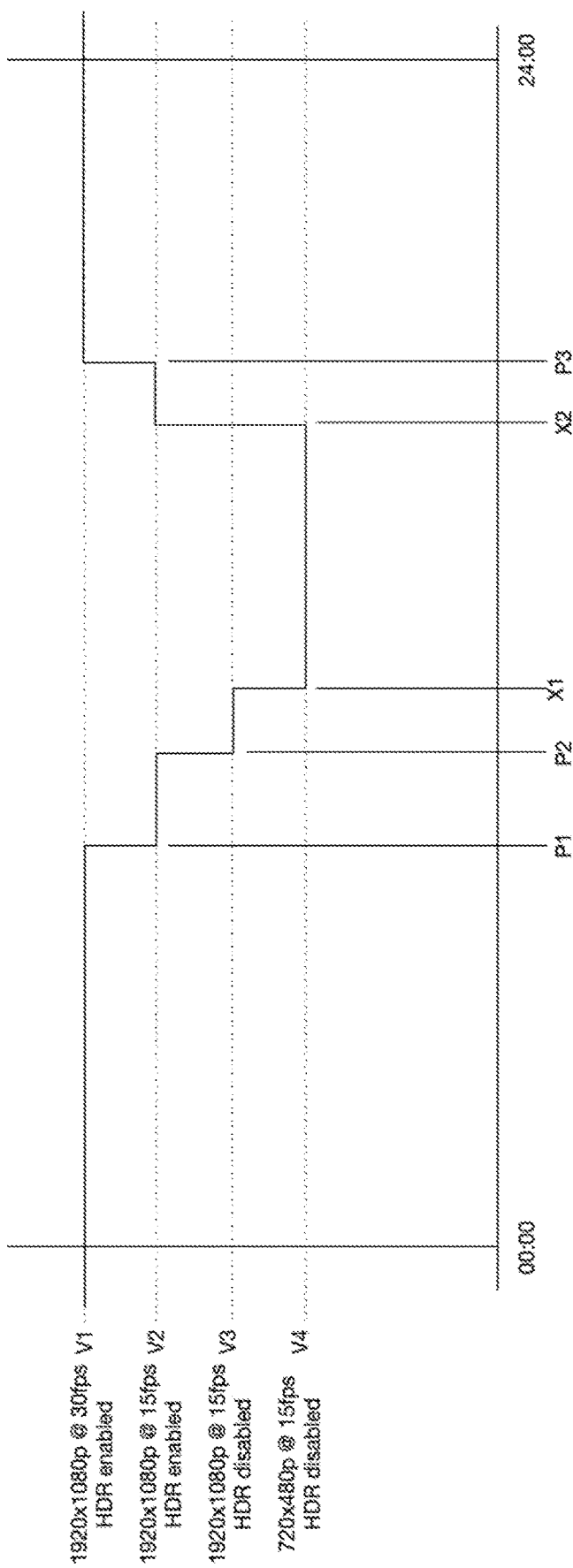
FIG. 6 shows an example scenario.

FIG. 6 shows an example application of the methods described herein. As shown, at time 00:00, a camera device, such as the camera device 12, the camera device 101, or camera device 102 of FIGS. 1, 2, and 3, may be operating normally. Under normal conditions, the internal temperature of the camera device (e.g., as measured by the temperature sensor 30 of FIG. 1) may, as an example, be 100° F. Under such normal conditions, the camera device may be able to operate using operating parameters V1, i.e. at a resolution of 1920×1080p, at a frame rate of 30 frames per second (fps), and with high dynamic range (HDR) imaging enabled. In accordance with the methods described above, it may be determined (e.g., predicted) that a solar event will, or is likely to, occur at time X1. It may further be determined that the solar event will, or is likely to, end at time X2. Using the methods described above, it may be determined that optimal performance of the camera device with minimal impact on the user experience may be achieved by enabling or disabling one or more of the functions of the camera, such as disabling higher frame rates, disabling higher resolutions, disabling HDR imaging or disabling the network interface 42 of FIG. 1, at one or more predetermined times before and after the solar event.

For example, it may have been determined using the algorithm described above (e.g. software 24 or software 48 of FIG. 1) that a predicted solar event at time X1 is likely to raise the internal temperature of the camera device by some amount, such as, for example, 5° F. In anticipation of this solar event, it may be determined to enable or disable one or more functions of the camera device a predetermined amount of time prior to the predicted time X1 of the solar event in order to cause the internal temperature of the camera device to cool, so that by the time X1 of the solar event, the predicted rise in temperature will not take the camera too far out of its normal operating temperature range. The enabling or disabling of the one or more functions of the camera may be performed all at once. Alternatively, or in addition, the enabling or disabling of all or some of the one or more functions may be performed gradually at more than one predetermined time prior to X1.

For example, with reference to FIG. 6, it may be determined to disable the highest frame rate (30 fps) at time P1 prior to X1 (i.e., switching to operating parameters V2—1920×1080p, 15 fps, HDR enabled) in order to bring the internal temperature of the camera device down to 98°, for example. It may further be determined to disable HDR imaging at time P2 prior to X1 (i.e., switching to operating parameters V3—1920×1080p, 15 fps, HDR disabled) in order to attempt to bring the temperature of the camera down further to 96° F. in anticipation of the solar event at X1. At time X1, it may further be determined to disable the highest resolution of the camera device to further attempt to reduce heat from internal components of the camera device, resulting in a change to operating parameters V4 (720×480p, 15 fps, HDR disabled). The gradual change from operating parameters V1-V2-V3-V4 may be advantageous in minimizing the impact on the user experience. However, in other examples, it may be determined to enable or disable the one or more functions of the camera all at once, such as, for example, causing a switch at P1 from operating parameters V1 to operating parameters V4. As can be appreciated, by enabling or disabling the one or more functions of the camera to reduce the internal temperature of the camera in anticipation of the solar event at time X1, the impact of the solar event on the camera device may be lessened or minimized. For example, if the enabling or disabling of the one or more functions is able to bring the internal temperature of the camera device down from its normal operating temperature of 100° F. to 96° F. prior to the time X1 of the solar event, then a rise in temperature of 5° F. as a result of the solar event will only cause the temperature of the camera to rise to 101° F. during the event (i.e., only one degree above normal operating temperature).

With continued reference to FIG. 6, it may alternatively, or in addition, be determined to disable the network interface 42 of FIG. 1 at X1 (e.g., turn off the transmitter and/or receiver and place the network interface in a standby/sleep state) in order to bring the internal temperature of the camera device down to 98°, for example. This may further reduce the thermal load of the camera, for example, in the event that lowering the frame rate or enabling/disabling one of the other operational parameters may not provide enough decrease. The camera may store the audiovisual stream locally on the camera (for example, in memory 23) until some amount of time after X2. Assuming that at time X2 the camera is in a thermal temperature range that allows it to return to normal operational state, the camera may enable the network interface and transmit the stored audiovisual stream to the network where the whole of the camera's audiovisual content may be stored. Alternatively, or in addition, the audiovisual stream may not be transmitted via the network, but instead may be stored on the camera until accessed and viewed by the user and/or retained until a user-defined date/time at which point the stored audiovisual stream may be deleted.

As further illustrated in FIG. 6, in anticipation of the solar event ending at time X2, it may be determined that both HDR imaging and the highest resolution (1920×1080p) may be re-enabled, such that the camera device may resume operating with parameters V2. While still operating below normal parameters V1, this change to parameters V2, coupled with the end of the solar event, may result in the internal temperature of the camera dropping to 98° by time P3 (i.e., more than enough for safe operation). Thus, at P3, it may be determined that the highest frame rate (30 fps) may also be re-enabled, such that the camera device is able to resume operating with normal parameters V1 and causing a rise back to the normal operating temperature of 100° F. It is understood that the example of FIG. 6 is just one example of application of the methods disclosed herein.

Figure 7:
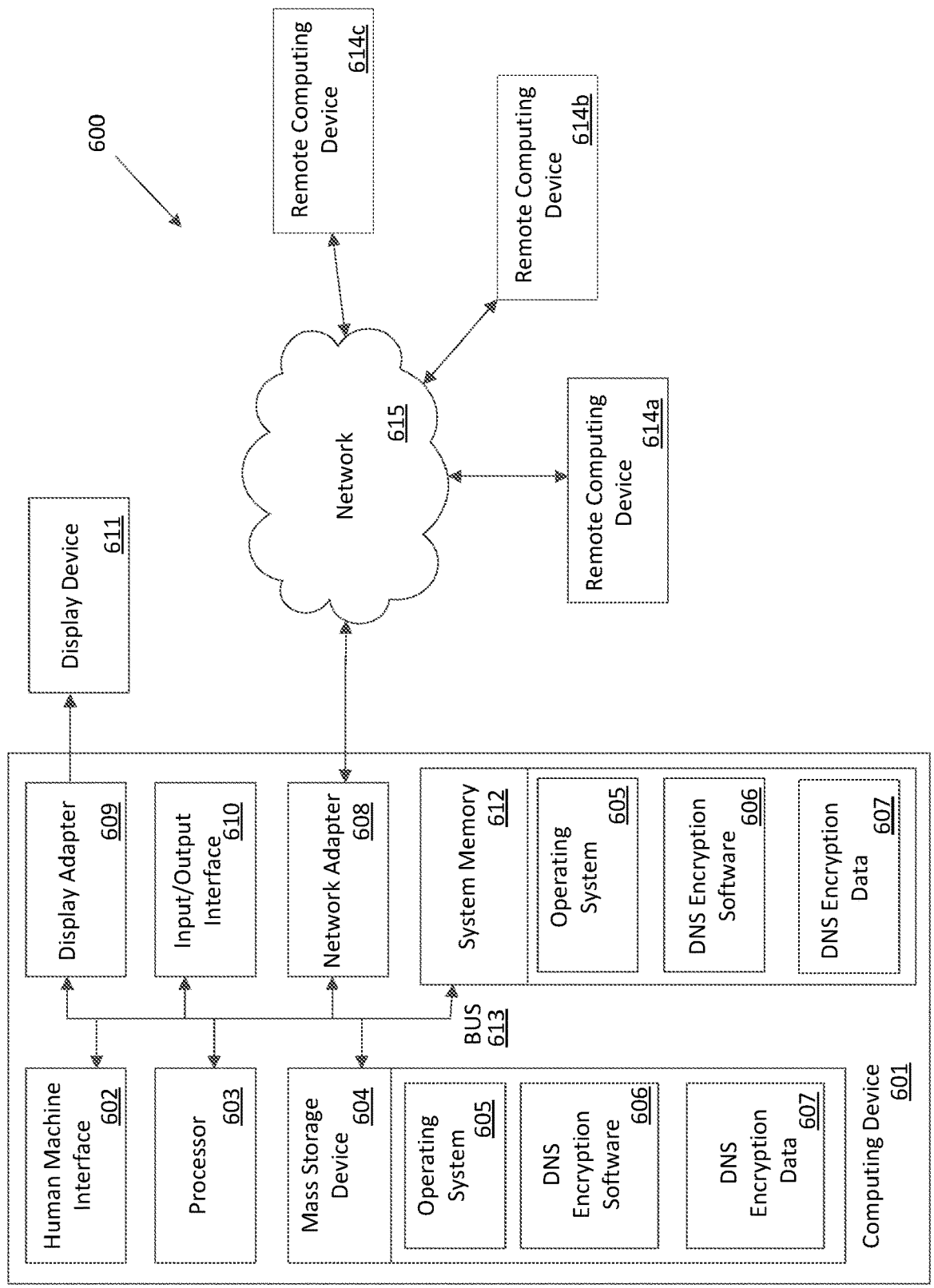
FIG. 7 shows an example computing environment.

FIG. 7 shows an example computing environment 600. The example computing environment 600 may comprise a computing device 601. All or some of the devices described herein may be implemented, at least in part, in the form of computing device 601. For example, at least some of the components of the camera device 12, camera device 101, or camera device 201 of FIGS. 1, 2, and 3 may be implemented in the form of computing device 601. The remote computing device 46 of FIG. 1 may also be implemented in the form of computing device 601, again as just one example.

The systems, methods, and apparatuses described herein may be operational with numerous other general purpose or special purpose computing system environments or configurations. Computing systems, environments, and/or configurations that may be suitable for use with the systems, methods, and apparatuses comprise, but are not limited to, personal computers, server computers, laptop devices, and multiprocessor systems. Set top boxes, programmable consumer electronics, network PCs, minicomputers, mainframe computers, distributed computing environments that comprise any of the above systems or devices, and the like may be used to implement the methods, systems, and apparatuses.

The systems, methods, and apparatuses may be implemented, in whole or in part, by software components. The disclosed methods, systems, and apparatuses may be described in the general context of computer-executable instructions, such as program modules, being executed by one or more computers or other devices. Program modules comprise computer code, routines, programs, objects, components, data structures, etc. that perform particular tasks or implement particular abstract data types. The methods, systems, and apparatuses may be practiced in grid-based and distributed computing environments where tasks are performed by remote processing devices that are linked through a communications network. In a distributed computing environment, program modules may be located in both local and remote computer storage media including memory storage devices.

The methods, systems, and apparatuses may be implemented via a general-purpose computing device in the form of a computing device 601. The components of the computing device 601 may comprise, but are not limited to, one or more processors 603, a system memory 612, and a system bus 613 that couples various system components including the processor 603 to the system memory 612. With multiple processors 603, the system may utilize parallel computing.

The system bus 613 represents one or more of several possible types of bus structures, including a memory bus or memory controller, a peripheral bus, an accelerated graphics port, and a processor or local bus using any of a variety of bus architectures. Such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 613, and all buses specified in this description may be implemented via a wired or wireless network connection and each of the subsystems, including the processor 603, a mass storage device 604, an operating system 605, DNS encryption software 606, DNS encryption data 607, a network adapter 608, system memory 612, an Input/Output Interface 610, a display adapter 609, a display device 611, and a human machine interface 602, may be contained within one or more remote computing devices 614a,b,c at physically separate locations, connected through buses of this form, in effect implementing a fully distributed system.

The computing device 601 typically comprises a variety of computer readable media. Readable media may be any available media that is accessible by the computing device 601 and comprises both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as DNS encryption data 607 and/or program modules such as operating system 605 and DNS encryption software 606 that are immediately accessible to and/or are presently operated on by the processor 603.

The computing device 601 may comprise other removable/non-removable, volatile/non-volatile computer storage media. FIG. 7 shows a mass storage device 604 which may provide non-volatile storage of computer code, computer readable instructions, data structures, program modules, and other data for the computing device 601. A mass storage device 604 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 604, including an operating system 605 and DNS encryption software 606. Each of the operating system 605 and DNS encryption software 606 (or some combination thereof) may comprise elements of the programming and the DNS encryption software 606. DNS encryption data 607 may be stored on the mass storage device 604. DNS encryption data 607 may be stored in any of one or more databases known in the art. Such databases may comprise, DB2®, Microsoft® Access, Microsoft® SQL Server, Oracle®, mySQL, PostgreSQL, and the like. The databases may be centralized or distributed across multiple systems.

The user may enter commands and information into the computing device 601 via an input device (not shown). Input devices may comprise, but are not limited to, a keyboard, pointing device (e.g., a "mouse"), a microphone, a joystick, tactile input devices such as gloves, and other body coverings, and the like. These and other input devices may be connected to the processor 603 via a human machine interface 602 that is coupled to the system bus 613, but may be connected by other interface and bus structures, such as a parallel port, game port, an IEEE 694 Port (also known as a Firewire port), a serial port, or a universal serial bus (USB).

A display device 611 may be connected to the system bus 613 via an interface, such as a display adapter 609. It is contemplated that the computing device 601 may have more than one display adapter 609 and the computing device 601 may have more than one display device 611. A display device may be a monitor, an LCD (Liquid Crystal Display), or a projector. Output peripheral devices may comprise components such as speakers (not shown) and a printer (not shown) which may be connected to the computing device 601 via Input/Output Interface 610. Any step and/or result of the methods may be output in any form to an output device. Such output may be any form of visual representation, including, but not limited to, textual, graphical, animation, audio, tactile, and the like. The display 611 and computing device 601 may be part of one device, or separate devices.

The computing device 601 may operate in a networked environment using logical connections to one or more remote computing devices 614*a,b,c* (e.g., remote computing device 46 of FIG. 1). A remote computing device may be a personal computer, portable computer, smartphone, a server, a router, a network computer, a peer device or other common network node, and so on. Logical connections between the computing device 601 and a remote computing device 614*a,b,c* may be made via a network 615, such as a local area network (LAN) and a general wide area network (WAN). Such network connections may be through a network adapter 608. A network adapter 608 may be implemented in both wired and wireless environments. Such networking environments are conventional and commonplace in dwellings, offices, enterprise-wide computer networks, intranets, and the Internet.

Application programs and other executable program components such as the operating system 605 are shown herein as discrete blocks, although it is recognized that such programs and components reside at various times in different storage components of the computing device 601, and are executed by the data processor(s) of the computer. An implementation of DNS encryption software 606 may be stored on or sent across some form of computer readable media. Any of the disclosed methods may be performed by computer readable instructions embodied on computer readable media. Computer readable media may be any available media that may be accessed by a computer. Computer readable media may comprise "computer storage media" and "communications media." "Computer storage media" comprise volatile and non-volatile, removable and non-removable media implemented in any methods or technology for storage of information such as computer readable instructions, data structures, program modules, or other data. Computer storage media may comprise, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computing device.

The invention claimed is:

1. A camera device comprising:
one or more processors; and
memory storing instructions that, when executed by the one or more processors, cause the camera device to:
monitor exposure to sunlight associated with the camera device;
predict, based on the monitoring the exposure to sunlight, a solar event associated the camera device;
cause, prior to occurrence of the solar event, a resolution associated with image data captured by the camera device to be reduced;
determine that the solar event has ended; and
cause, based on the determining that the solar event has ended, the resolution associated with the image data captured by the camera device to be increased.

2. The camera device of claim 1, wherein the solar event comprises at least one of a critical camera device temperature, sun brightness, or angle of sunlight.

3. The camera device of claim 1, wherein the solar event is predicted to cause damage to at least one of hardware of the camera device, imagery generated by the camera device, or video generated by the camera device.

4. The camera device of claim 1, wherein the instructions that, when executed by the one or more processors, cause the camera device to monitor the exposure to sunlight associated with the camera device cause the camera device to determine a direction of sunlight relative to a location of the camera device.

5. The camera device of claim 4, wherein the instructions that, when executed by the one or more processors, cause the camera device to determine the direction of the sunlight relative to the location of the camera device cause the camera device to determine the direction of the sunlight relative to the location of the camera device using at least one of a magnetometer, a gyroscope, a global positioning system (GPS), a user account, or artificial intelligence.

6. The camera device of claim 1, wherein the instructions that, when executed by the one or more processors, cause the camera device to predict the solar event cause the camera device to determine a time of day that the solar event will occur.

7. The camera device of claim 1, wherein the instructions that, when executed by the one or more processors, cause the camera device to monitor the exposure to sunlight associated with the camera device cause the camera device to determine current weather.

8. The camera device of claim 1, wherein the instructions that, when executed by the one or more processors, cause the camera device to monitor the exposure to sunlight associated with the camera device cause the camera device to detect one or more objects that provide shade to the camera device.

9. The camera device of claim 1, wherein the instructions that, when executed by the one or more processors, cause the camera device to monitor the exposure to sunlight associated with the camera device cause the camera device to determine an orientation of the camera device.

10. A non-transitory computer-readable medium storing instructions that, when executed, cause:
monitoring exposure to sunlight associated with a camera device;
predicting, based on the monitoring the exposure to sunlight, a solar event associated the camera device;
causing, prior to occurrence of the solar event, a resolution associated with image data captured by the camera device to be reduced;
determining that the solar event has ended; and
causing, based on the determining that the solar event has ended, the resolution associated with the image data captured by the camera device to be increased.

11. The non-transitory computer-readable medium of claim 10, wherein the solar event comprises at least one of a critical camera device temperature, sun brightness, or angle of sunlight.

12. The non-transitory computer-readable medium of claim 10, wherein the solar event is predicted to cause damage to at least one of hardware of the camera device, imagery generated by the camera device, or video generated by the camera device.

13. The non-transitory computer-readable medium of claim 10, wherein the instructions that, when executed, cause monitoring the exposure to sunlight associated with the camera device cause determining a direction of sunlight relative to a location of the camera device.

14. The non-transitory computer-readable medium of claim 13, wherein the instructions that, when executed, cause determining the direction of the sunlight relative to the location of the camera device cause determining the direction of the sunlight relative to the location of the camera device using at least one of a magnetometer, a gyroscope, a global positioning system (GPS), a user account, or artificial intelligence.

15. The non-transitory computer-readable medium of claim 10, wherein the instructions that, when executed, cause predicting the solar event cause determining a time of day that the solar event will occur.

16. The non-transitory computer-readable medium of claim 10, wherein the instructions that, when executed, cause monitoring the exposure to sunlight associated with the camera device cause determining current weather.

17. The non-transitory computer-readable medium of claim 10, wherein the instructions that, when executed, cause monitoring the exposure to sunlight associated with the camera device cause detecting one or more objects that provide shade to the camera device.

18. The non-transitory computer-readable medium of claim 10, wherein the instructions that, when executed, cause monitoring the exposure to sunlight associated with the camera device cause determining an orientation of the camera device.

19. A camera device comprising:
one or more processors; and
memory storing instructions that, when executed by the one or more processors, cause the camera device to:
monitor exposure to sunlight associated with the camera device;
predict, based on the monitoring the exposure to sunlight, a solar event associated the camera device;
cause, prior to occurrence of the solar event, a frame rate associated with image data captured by the camera device to be reduced;
determine that the solar event has ended; and
cause, based on the determining that the solar event has ended, the frame rate associated with the image data captured by the camera device to be increased.

20. The camera device of claim 19, wherein the solar event comprises at least one of a critical camera device temperature, sun brightness, or angle of sunlight.

21. The camera device of claim 19, wherein the solar event is predicted to cause damage to at least one of hardware of the camera device, imagery generated by the camera device, or video generated by the camera device.

22. The camera device of claim 19, wherein the instructions that, when executed by the one or more processors, cause the camera device to monitor the exposure to sunlight associated with the camera device cause the camera device to determine a direction of sunlight relative to a location of the camera device.

23. The camera device of claim 22, wherein the instructions that, when executed by the one or more processors, cause the camera device to determine the direction of the sunlight relative to the location of the camera device cause the camera device to determine the direction of the sunlight relative to the location of the camera device using at least one of a magnetometer, a gyroscope, a global positioning system (GPS), a user account, or artificial intelligence.

24. The camera device of claim 19, wherein the instructions that, when executed by the one or more processors, cause the camera device to predict the solar event cause the camera device to determine a time of day that the solar event will occur.

25. The camera device of claim 19, wherein the instructions that, when executed by the one or more processors, cause the camera device to monitor the exposure to sunlight associated with the camera device cause the camera device to determine current weather.

26. The camera device of claim 19, wherein the instructions that, when executed by the one or more processors, cause the camera device to monitor the exposure to sunlight associated with the camera device cause the camera device to detect one or more objects that provide shade to the camera device.

27. The camera device of claim 19, wherein the instructions that, when executed by the one or more processors, cause the camera device to monitor the exposure to sunlight associated with the camera device cause the camera device to determine an orientation of the camera device.

28. A non-transitory computer-readable medium storing instructions that, when executed, cause:
monitoring exposure to sunlight associated with a camera device;
predicting, based on the monitoring the exposure to sunlight, a solar event associated the camera device;
causing, prior to occurrence of the solar event, a frame rate associated with image data captured by the camera device to be reduced;
determining that the solar event has ended; and
causing, based on the determining that the solar event has ended, the frame rate associated with the image data captured by the camera device to be increased.

29. The non-transitory computer-readable medium of claim 28, wherein the solar event comprises at least one of a critical camera device temperature, sun brightness, or angle of sunlight.

30. The non-transitory computer-readable medium of claim 28, wherein the solar event is predicted to cause damage to at least one of hardware of the camera device, imagery generated by the camera device, or video generated by the camera device.

31. The non-transitory computer-readable medium of claim 28, wherein the instructions that, when executed, cause monitoring the exposure to sunlight associated with the camera device cause determining a direction of sunlight relative to a location of the camera device.

32. The non-transitory computer-readable medium of claim 31, wherein the instructions that, when executed, cause determining the direction of the sunlight relative to the location of the camera device cause determining the direction of the sunlight relative to the location of the camera device using at least one of a magnetometer, a gyroscope, a global positioning system (GPS), a user account, or artificial intelligence.

33. The non-transitory computer-readable medium of claim 28, wherein the instructions that, when executed, cause predicting the solar event cause determining a time of day that the solar event will occur.

34. The non-transitory computer-readable medium of claim 28, wherein the instructions that, when executed, cause monitoring the exposure to sunlight associated with the camera device cause determining current weather.

35. The non-transitory computer-readable medium of claim 28, wherein the instructions that, when executed, cause monitoring the exposure to sunlight associated with the camera device cause detecting one or more objects that provide shade to the camera device.

36. The non-transitory computer-readable medium of claim 28, wherein the instructions that, when executed, cause monitoring the exposure to sunlight associated with the camera device cause determining an orientation of the camera device.

\* \* \* \* \*